H. W. BROWN.
ELECTRICAL PROTECTIVE DEVICE.
APPLICATION FILED DEC. 19, 1913.
1,159,892. Patented Nov. 9, 1915.
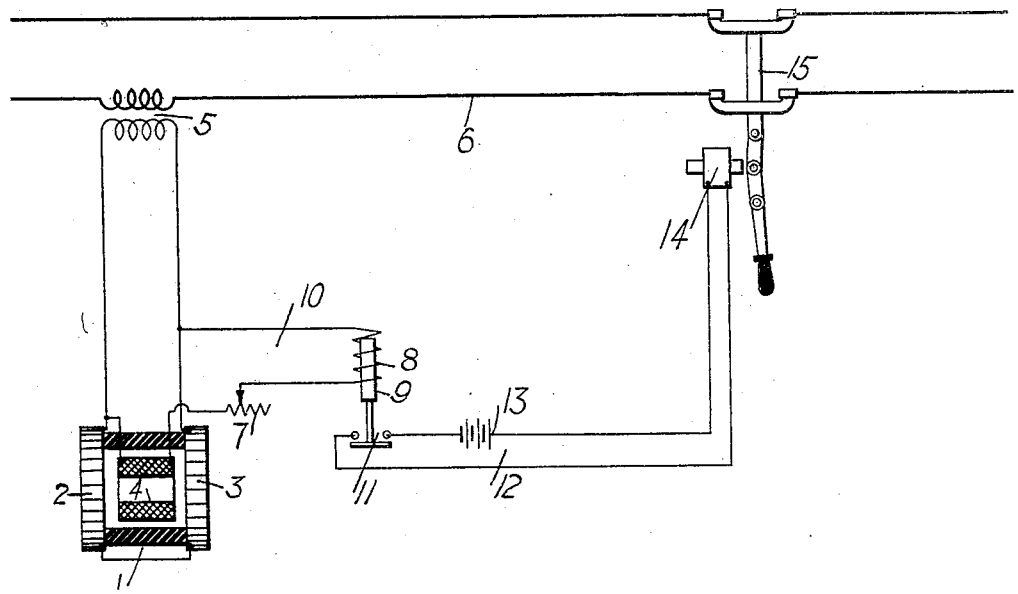
WITNESSES:
INVENTOR
Harold W. Brown
BY
ATTORNEY

UNITED STATES PATENT OFFICE.

HAROLD W. BROWN, OF ITHACA, NEW YORK, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,159,892.

Specification of Letters Patent.   Patented Nov. 9, 1915.

Application filed December 19, 1913.   Serial No. 607,713.

*To all whom it may concern:*

Be it known that I, HAROLD W. BROWN, a citizen of the United States, and a resident of Ithaca, in the county of Tompkins and State of New York, have invented a new and useful Improvement in Electrical Protective Devices, of which the following is a specification.

My invention relates to electrical protective devices and particularly to relays.

The object of my invention is to provide a relay which will operate instantly at a predetermined load and which will operate at other loads after a time which varies inversely as the load.

Electric circuits are usually protected in such a manner that, with relatively excessive overloads, the circuits will open in a shorter time than with relatively small overloads. However, the nature of the load and of the circuit and the conditions of operation make it desirable, in some cases, to have one shape of time-load curve whereas an altogether different shape is desirable in other cases. My invention is applicable to the protection of such circuits as supply induction motors. The excessive currents taken by induction motors in starting, continue, in some cases, for a minute or so but they are usually not allowed to continue for a much longer period. Consequently, protection should be almost instantaneous when the load greatly exceeds that which is required for starting the motor. These conditions call for a relay the characteristic curve of which has a comparatively sharp angle between its vertical and horizontal portions. In my invention, I provide such a relay and I provide also means for introducing a time element in its operation should the same be necessary.

The single figure of the accompanying drawing is a diagrammatic view of a circuit which is protected by a relay embodying my invention.

My invention, as shown in the accompanying drawing, comprises a body 1, having external heating elements 2 and 3 and an internal heating element 4. The heating elements 2 and 3 are connected in series and are supplied with current from a transformer 5 which is proportional to the current flowing in a circuit 6. A variable resistor 7 and a magnet coil 8, having a movable core member 9, are connected in series with the heating element 4 to form a circuit 10 which is connected in shunt relation to the circuit containing the heating elements 2 and 3. The movable core member 9 carries the movable member of the switch 11 which is located in a circuit 12 that includes a battery 13 and a trip coil 14 of a circuit breaker 15 used to interrupt the circuit 6 under predetermined conditions, as controlled by the relay.

As hereinbefore stated, my invention comprises two parallel circuits, the resistances of which are varied by variations of temperature, and, if a constant current flows through the two conductors in parallel, the heating of one conductor, and the resulting increase of its resistance, will cause a relatively larger current to flow through the other conductor. If, however, both conductors are heated and have their resistances thus increased, the re-distribution of the current depends upon the relative increase of the two resistances. If one of the conductors has a large temperature co-efficient of resistance, or if it is so constructed that it does not dissipate its heat and, consequently, becomes very hot, the distribution of current becomes very different from that when the resistors are cold. I provide two heating elements having relatively high temperature coefficients, the inner one 4 of which retains its heat longer than the outer ones 2 and 3.

When an excessive overload is applied to the circuit 6, current will flow through both branches of the relay and, if the current through branch 10 is sufficiently large, the movable core 9 will be operated to close the switch 11 and thus permit the battery 13 to energize the coil 14 to trip the breaker 15. Should the load on the circuit 6 not be large enough to cause the tripping of the circuit breaker 15 instantly, it will raise the temperature of the heating elements 2 and 3 and thus increase their resistance and cause more current to flow through the circuit 10. The current therefore depends inversely upon the time of operation because the rise in resistance of the resistor depends upon the degree of heating and the heating is due directly to the current. Hence, when enough current has been diverted from the resistors 2 and 3 to the resistor 4 and the circuit 10, it will cause the breaker 15 to interrupt the circuit 6, as hereinbefore explained. While the temperature of the outer heating elements 2 and 3 is increasing, a comparatively slight change is effected in the temperature of the heating element 4 because comparatively little of the total current flows through it, but, when the outer elements 2 and 3 are hot, they transmit heat to the inner element by conduction through the body 1 and by convection through the air. The reduction in temperature of the outer elements will be more rapid than that of the inner element, when deënergized, because of the greater opportunity for heat radiation. The result is that, after the apparatus has operated once, both the outer elements 2 and 3 and the inner element 4 are hotter than they were before the first operation. If the relay is properly compensated, the period of operation the second time the overload occurs will be approximately the same as the first time, and the minimum current at which it operates will be approximately the same the second time as the first, as will be the third and each successive time, because both elements have the same ratio with respect to time of operation. To get the proper compensation, however, requires a proper relation of the various resistances in the two parallel circuits and the proper radiating surfaces, as well as proportioning of the resistance in the inner element, so that the heat flow will effect a part of it in a short time and more of it in a longer time.

Changes in the proportions and materials of my invention may be made, and different methods of adapting it to the tripping of a circuit may be made by those skilled in the art without departing from the scope of the same as set forth in the appended claims.

I claim as my invention:

1. In an electrical protective device, the combination with two resistors having relatively different temperature gradients, of electro-responsive means in series with one of the said resistors, said resistors being so disposed that one heats the other.

2. An electrical protective device comprising two resistors so disposed that one heats the other, and electro-responsive means operatively connected to the said resistors.

3. An electrical protective device comprising two resistors so disposed that one heats the other and electro-responsive means connected in series with one of the said resistors.

4. In an electrical protective device, the combination with a resistor having a relatively high temperature co-efficient, of a resistor having a relatively low temperature co-efficient, a trip coil connected in series with the said resistor having the low temperature co-efficient, the resistor having the high temperature co-efficient being connected in shunt relation to the circuit comprising the other resistor and the trip coil and being adapted to heat the resistor having the low temperature co-efficient.

5. An electrical protective device comprising a resistor that becomes heated when in operation, a second resistor connected in parallel with the said first resistor and in heat-conducting relation therewith and tripping means in circuit with the said second resistor.

6. In an electric circuit, the combination with a circuit interrupter and a trip coil therefor, of two resistors disposed in heat-conducting relation to each other and operatively connected to the electric circuit, said trip coil being operatively connected to one of the said resistors.

7. In an electrical protective device, the combination with a resistor that becomes heated when in operation and a second resistor connected in parallel with the said first resistor, said first resistor being adapted to heat the said second resistor, of means in circuit with the said second resistor for controlling an auxiliary circuit.

8. In an electrical protective device, the combination with two main resistors disposed in heat-conducting relation to each other, of an adjustable auxiliary resistor, and a magnet winding, said adjustable auxiliary resistor and the magnet winding being connected in series relation to one of the said main resistors and the circuit thus constituted being connected in shunt relation to the other main resistor.

In testimony whereof, I have hereunto subscribed my name this 28th day of November, 1913.

HAROLD W. BROWN.

Witnesses:
  FRED L. CLOCK,
  H. PROCTOR.

Copies of this patent may be obtained for five cents each, by addressing the "Commissioner of Patents, Washington, D. C."